Nov. 19, 1957 W. J. ADAMS, JR., ET AL 2,813,433
TRANSMISSION
Filed May 3, 1954 3 Sheets-Sheet 3
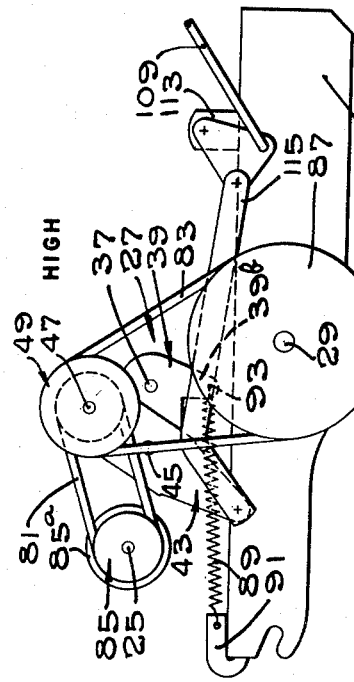
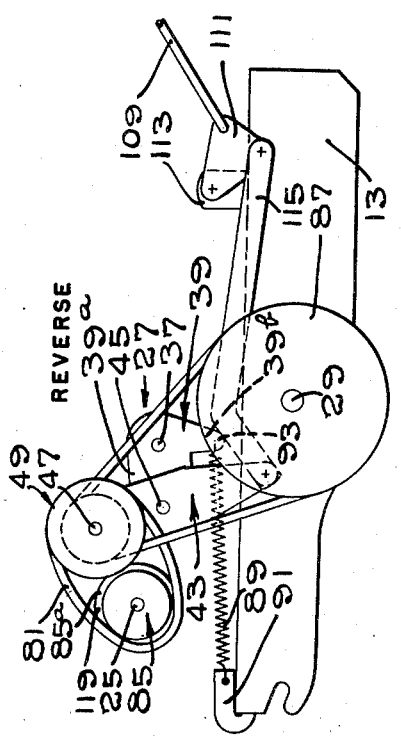
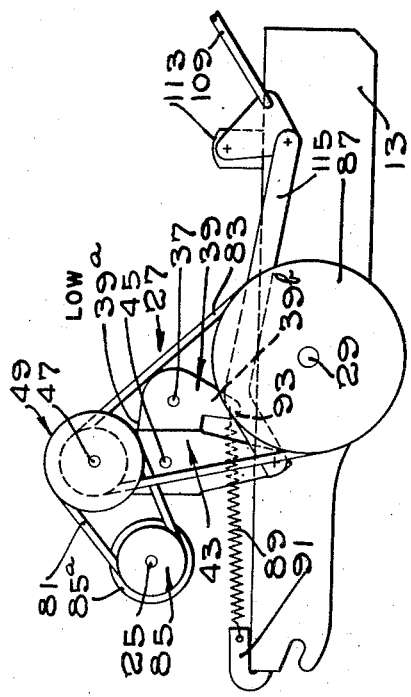
INVENTORS
WILLIAM J. ADAMS, JR.
KNUTE O. ENGNELL
BY *Hans G. Hoffmeister*
ATTORNEY

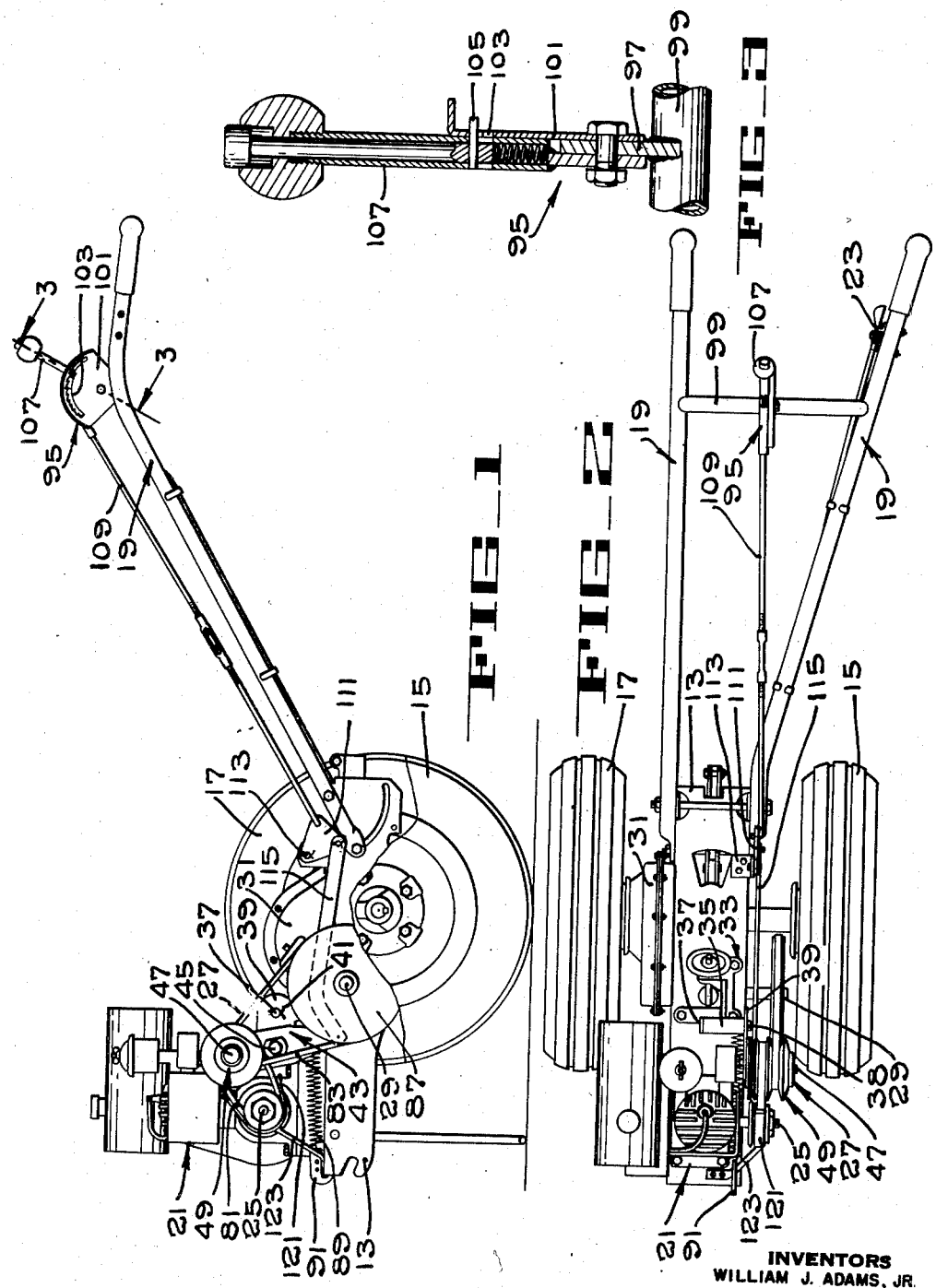

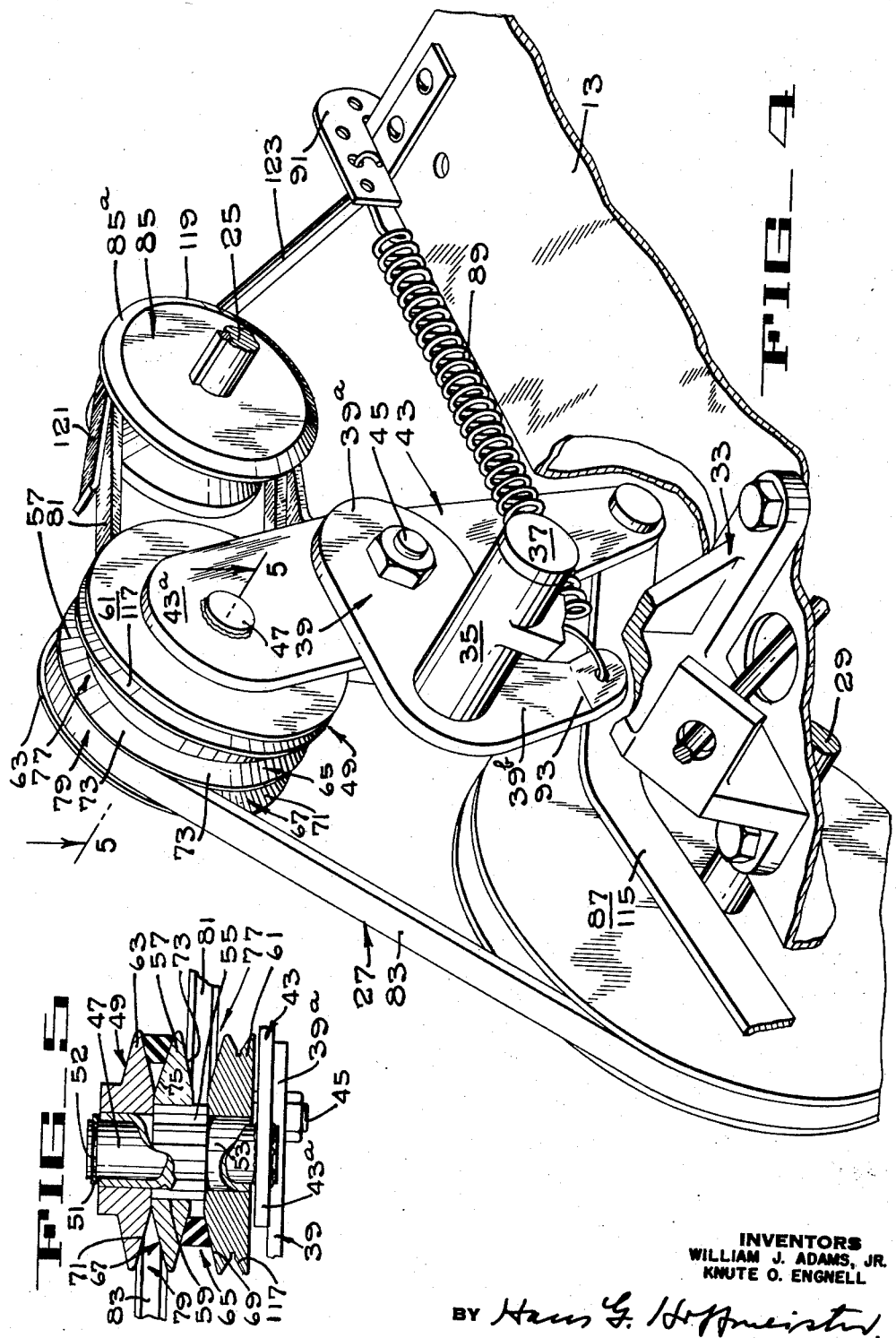

United States Patent Office 2,813,433
Patented Nov. 19, 1957

2,813,433
TRANSMISSION

William J. Adams, Jr., Campbell, Calif., and Knute O. Engnell, Port Washington, Wis., assignors to Food Machinery and Chemical Corporation, San Jose, Calif., a corporation of Delaware Application May 3, 1954, Serial No. 427,090

11 Claims. (Cl. 74—218)

The present invention pertains to mechanical transmissions.

One object of the present invention is to provide an improved mechanical transmission.

Another object is to provide an inexpensive and durable reversible mechanical transmission.

Another object is to provide a mechanical transmission having forward, neutral and reverse operational positions, wherein the necessity of declutching, changing gears, and clutch reengagement for the purpose of shifting from one to another of its operational positions is eliminated.

Another object is to provide a belt type mechanical transmission having reverse, neutral, and multiple forward operational positions.

These and other objects and advantages of the present invention will become apparent from the following description and the accompanying drawings in which:

Fig. 1 is a side elevation of a garden tractor equipped with a transmission embodying the present invention, certain parts being broken away.

Fig. 2 is a plan view of the tractor shown in Fig. 1.

Fig. 3 is a cross section taken along the line 3—3 of Fig. 1.

Fig. 4 is an enlarged perspective of a portion of the tractor shown in Fig. 1, certain parts being shown in a different operational position.

Fig. 5 is a horizontal cross section taken along the plane indicated by the line 5—5 of Fig. 4.

Figs. 6, 7, and 8 are diagrammatic side elevations of a portion of the tractor shown in Fig. 1, showing it in various operational positions.

The present invention is shown embodied in a transmission mechanism for a walking type garden tractor having a frame 13 (Fig. 1) supported above the ground by two drive wheels 15 and 17 and provided with a pair of rearwardly extending handle bars 19. An internal combustion engine 21 is mounted on the front portion of the frame 13 and is controlled from a throttle lever 23 (Fig. 2) mounted on one of the handle bars 19. Power to drive the tractor forward or backward is transmitted from the engine shaft 25 to a driven shaft 29 mounted on the frame 13 by a variable speed mechanical transmission 27 embodying the invention. The shaft 29 is operatively connected to the drive wheels 15 and 17 through a train of gears (not shown) housed in a gear case 31.

The mechanical transmission 27 (Fig. 2) is mounted on a support bracket 33 bolted to the tractor frame 13 at the rear of the engine 21. The bracket 33 is formed with a horizontal, transversely extending bearing 35 that journals a headed pivot pin 37 which projects from the bearing, as shown at 38 (Fig. 2). An L-shaped bell crank 39 (Fig. 4) is pivotally mounted at its bight on the projecting end 38 of the pin 37 and is held thereon against axial movement by a cotter pin 41 (Fig. 1). A lever 43 (Fig. 4) is pivotally mounted intermediate its ends on a long arm 39a of the L-shaped bell crank 39 by means of a bolt and nut assembly 45. A stubshaft 47 (Fig. 5) rigid with the upper end 43a of the lever 43 extends laterally outward therefrom and a pulley mechanism 49 is rotatably mounted on the shaft 47. Axial displacement of the pulley mechanism 49 on the shaft 47 is prevented by a snap ring 51 seated in a peripheral groove 52 formed on the free end of the shaft 47.

The pulley mechanism 49 (Fig. 5) is of the well-known double sheave expansible type and comprises a tubular shaft 53 that rotates freely on the stub shaft 47 and which has an enlarged splined portion 55 intermediate its ends which mounts a disc 57 having a complementally splined axial aperture 59. The disc 57 is free to slide axially on the splined shaft portion 55, but is prevented from moving off the splined portion by a pair of axially apertured discs 61 and 63 that are firmly pressed on the opposite ends of the shaft 53 in abutting relation to the enlarged splined portion 55 thereof. The discs 61 and 63 form the outer flanges of a pair of expansible sheaves 65 and 67 which have a common inner flange formed by the slidable disc 57. The inner faces 69 and 71 of the discs 61 and 63, respectively, are frusto-conical as are the opposite faces 73 and 75 of the slidable disc 57, thereby defining tapered grooves 77 and 79 on the periphery of the sheaves 65 and 67 which are adapted to receive V-belts 81 and 83, respectively. By shifting the disc 57 axially of the shaft 53 the effective diameters of the sheaves 65 and 67 may be inversely varied, thus causing the belts 81 and 83 to move radially in and out on the sheaves 65 and 67. In this well known manner the forward speed ratio of the transmission 27 may be infinitely varied within the limits provided by the pulley mechanism 49.

Power for moving the tractor forward is transferred to the transmission 27 (Fig. 4) through the V-belt 81 which is trained around the driven expansible sheave 65 of the pulley mechanism 49 and around a drive sheave 85 keyed to the engine shaft 25. Power is transferred from the transmission 27 to the driven shaft 29 through the V-belt 83 which is trained around the driving expansible sheave 67 of the pulley mechanism 49 and around a driven sheave 87 keyed to the shaft 29. While the transmission 27 is in any of its forward driving speed ratio positions the belts 81 and 83 are maintained under substantially equal tension by a spring 89 tensioned between a hook 91 engaged over the front end of the frame 13 and an inwardly bent lug 93 on the short arm 39b of the L-shaped bell crank 39. The pull of the spring 89 constantly urges the bell crank 39 to rotate counterclockwise, as seen in Fig. 4, thereby urging the lever 43 and the pulley mechanism 49 mounted thereon up and away from both the drive sheave 85 and the driven sheave 87, so that a constant pull is exerted on the belts 81 and 83.

The mechancal transmission 27 is shifted to its various operational positions by turning the lever 43 about the nut and bolt assembly 45 which mounts it on the arm 39. The positioning of the lever 43 is regulated from a quadrant and lever assembly 95 (Figs. 1 and 2) conveniently mounted on an ear 97 (Fig. 3) that is welded to a cross brace 99 secured between the handle bars 19. The assembly 95 (Fig. 3) comprises a stationary sector shaped plate 101 having an arcuate, toothed slot 103, the teeth of which are adapted to selectively receive a spring urged detent 105 mounted on an arm 107 pivotally supported by the ear 97. The arm 107 is pivotally connected to one end of an adjustable-length rod 109 (Fig. 2), the other end of which is pivotally fastened to one apex of a triangular lever 111 (Figs. 1 and 2) that is pivotally mounted at another of its apexes to a bracket 113 secured to the frame 13. One end of a link or interponent 115 is pivotally secured to the triangular lever 111 at its third apex and the opposite end of the link 115 is pivoted to the lower end of the lever 43. Pivotal movement of the transmission control lever 107 in either direction, results in corresponding movement of the pulley mechanism supporting lever 43 in the opposite direction.

In addition to transmitting power to the driven shaft 29 for moving the tractor forward, the transmission 27 is also capable of transmitting power to the shaft 29 for moving the tractor rearward. According to the present invention reversal of the direction of rotation of the transmission 27 in order to reverse the direction of rotation of the shaft 29 and to thereby move the tractor rearward is accomplished by pivoting the lever 43 clockwise, as seen in Fig. 4, until the disc 61 of the pulley mechanism 49 frictionally engages a diametrically enlarged flange 85a of the drive sheave 85. To afford adequate frictional contact between the disc 61 and the sheave 85 the disc 61 is peripherally grooved, as shown at 117, and the flange 85a of the sheave 85 is tapered to fit into the groove 117. While the transmission is in its reverse drive position, as shown in Fig. 8, the belt 81 is slack and hence performs no driving function. However, the belt 83 is maintained in tension by the action of the spring 89 and, therefore, power transferred to the pulley mechanism 49 by the frictional engagement of the sheave 85 and the disc 61 is transmitted through the belt 83 to the driven sheave 87 and the shaft 29. To prevent the loosened V-belt 81 from being thrown off the rotating sheave 85, a U-shaped strap 121 (Figs. 1 and 4) fastened to a bracket 123 supported by the frame 13 embraces the sheave 85 in radially spaced relation along that sector of the sheave 85 that is normally engaged by the belt 81.

To set the transmission 27 to neutral position as shown in Fig. 1, the pulley mechanism 49 is moved so close to the engine sheave 85 that the drive belt 81 is relieved of tension but not so close that the disc 61 contacts the enlarged flange 85a of the engine sheave. Thus, any transmission of power from the sheave 85 to the sheave 65 of the pulley mechanism 49 is prevented. However, even when the transmission 27 is in the described neutral setting, the angular position of the lever 43 and the pull of the spring 89 are such that the expansible sheave 67 of the pulley mechanism 49 tensions the driven belt 83. At this time the slidable disc 57 (Fig. 5) of the pulley mechanism 49 is shifted laterally against the disc 61 and the belt 83 rides in its lowermost position in the groove 79 of the expansible sheave 67 which position establishes the lowest speed ratio.

When it is desired to drive the tractor forward the control lever 107 is swung forward a small amount from the position shown in Fig. 1, swinging the lever 43 clockwise about its pivot 45 as viewed in Figure 6, and moving the pulley mechanism 49 into the position shown in said Fig. 6. Such movement of the mechanism 49 tensions the drive belt 81 thereby enabling it to transmit power from the engine sheave 85 to the pulley mechanism 49 from which power is transmitted to the driven shaft 29. In the described position power transmission from the engine sheave 85 to the driven shaft 29 occurs at the lowest speed ratio, because the driving belt 81 rides in its highest position in the groove 77 (Fig. 5) of the expansible sheave 65, and the driven belt 83 rides in its lowermost position on the expansible sheave 67.

To increase the forward speed of the tractor the lever 107 (Fig. 1) is swung farther forward thereby moving the pulley mechanism 49 away from the engine sheave 85. As the mechanism 49 moves in this manner the belt 81 forces the slidable disc 57 (Fig. 5) to move laterally toward the disc 63. This lateral movement of the disc 57 expands the sheave 65 and contracts the sheave 67, causing the belt 81 to ride lower on the sheave 65, and the belt 83 to ride higher on the sheave 67. Thereby the speed ratio of the transmission is increased. Maximum forward movement of the lever 107 (Fig. 1) results in the positioning of the transmission 27 in its highest speed ratio position, as shown in Figures 4, 5 and 7, in which the belt 81 is in its lowermost position on the expansible sheave 65 and the belt 83 is in its highest position on the expansible sheave 67.

To reduce the forward speed of the tractor the lever 107 is swung rearwardly (Fig. 1), thus swinging the pulley mechanism 49 toward the sheave 85 which reduces momentarily the tension on the belt 81. The tension on the belt 83 created by the spring 89 then causes the disc 57 to move toward the disc 61 until the tension on the belts 81 and 83 is equalized. This movement of the disc 57 toward the disc 61 reduces the speed ratio of the transmission 27 and slows the forward speed of the tractor. Hence, it is evident that the transmission 27 may be adjusted to any desired speed ratio position within the limits of the mechanism, so the tractor can be operated successfully under a wide variety of load conditions.

For each speed ratio position of the transmission 27 there is a corresponding ideal position of the pivot point or nut and bolt assembly 45, which acts as a mounting means for the lever 43, at which ideal position the tension on the belts 81 and 83 is substantially equal. Because of the pivotal mounting of the bell crank 39 which carries the pivot 45 of lever 43 and the connection of the short arm 39b of the bell crank with the spring 89, the bell crank 39 automatically assumes the position in which the pivot or lever mounting means 45 is in its ideal location for any adjusted position of the transmission 27. As may be seen by comparing Figures 6 and 7, the pivot 45 is depressed as the forward speed ratio of the transmission is increased. In the low transmission position (Fig. 6) the pivot 45 is above the horizontal plane determined by the pivot point of bell crank 39, and in the high transmission position (Fig. 7) the pivot 45 lies substantially in the aforesaid horizontal plane. The above described floating arrangement of the pivot point 45 of the lever 43 keeps the belts 81 and 83 in driving relation to their respective pulleys, keeps the belts 81 and 83 under substantially equal tension regardless of the forward drive position of the transmission, and reduces strain and wear on said belts.

When it is desired to drive the tractor backward, the control lever 107 is placed in neutral position, as shown in Fig. 1, which removes tension from the belt 81 and prevents the transmission of power to the pulley mechanism 49. Then the control lever 107 is swung rearwardly until the detent 105 (Fig. 3) contacts the rear of the arcuate slot 103. This movement of the lever 107 causes the lever 43 to pivot counterclockwise about its pivot 45 as viewed in Figure 8 and brings the peripheral groove 117 (Fig. 4) on the disc 61 into frictional contact with the tapered rim 119 of the drive sheave 85. This frictional contact between the disc 61 and the sheave 85 causes the sheave 85 to rotate the disc 61 in the direction opposite to that in which the belt 81 rotated the disc 61. Such opposite rotation of the disc 61 results in a reverse rotation of the driven sheave 87 and in rearward movement of the tractor. As shown in Fig. 8, when the transmission 27 is in its reverse position, the pivot 45 of lever 43 is positioned below the horizontal plane determined by the pivot point of bell crank 39. It is this depression of the pivot point or lever mounting means 45 which allows the lever 43 to be pivoted so that the disc 61 may contact the sheave 85. Without this depression of the pivot point 45 it would be impossible to move the disc 61 into contact with the sheave 85, since the fixed length of the belt 83 would prevent the lever 43 from carrying the disc 61 farther from the pulley 87 than the position shown in Fig. 1.

While we have described a preferred embodiment of the present invention it will be understood that various changes and modifications may be made in the details thereof without departing from the spirit and scope of the appended claims.

Having thus described the invention what we claim as new and desire to protect by Letters Patent is:

1. A device for transmitting power from a rotatable driving member to a rotatable driven member comprising a support, first mounting means movably carried by the support, second mounting means movably carried by the first mounting means, a double sheave expansible pulley mechanism rotatably supported by the second mounting means, belts interconnecting the pulley mechanism with the driving and driven members, means for moving the second mounting means to place the pulley mechanism into a variety of belt driven positions, and means resiliently urging the first mounting means away from the driving and driven members to maintain substantially equal tension on the belts in all belt driven positions of the pulley mechanism.

2. A device for transmitting power from a rotatable driving member to a rotatable driven member comprising a support, a first lever pivotally mounted on the support, a second lever pivotally supported by said first lever, a double sheave expansible pulley mechanism rotatably supported by said second lever, belts interconnecting the pulley mechanism with the driving and driven members, means for swinging said second lever about its pivotal axis to place the pulley mechanism into a variety of driven positions, and means resiliently urging the first lever to swing the pulley mechanism away from the driving and driven members to maintain the belts in tension and to allow adjustment of the axis of said second lever upon swinging of said second lever about its pivotal axis.

3. A device for transmitting power from a rotatable driving member to a rotatable driven member comprising a support, a rotatable double sheave expansible pulley carried by the support for adjustment relative to the driving and driven members, belts adapted to interconnect the pulley with the driving and driven members to cause rotation of the driven member in a predetermined direction, means for adjusting the pulley relative to the driving and driven members to vary the speed ratio of the pulley and to bring the pulley into frictional engagement with the driving member while removing the pulley from belt engagement with the driving member to cause rotation of the driven member opposite to said predetermined direction.

4. A device for transmitting power from a rotatable driving member to a rotatable driven member comprising a support, a rotatable pulley mechanism movably carried by the support, means adapted to interconnect the pulley mechanism and the driven member, first means adapted to interconnect the pulley mechanism and the driving member for rotating the pulley mechanism in a predetermined direction, second means adapted to interconnect the pulley mechanism and the driving member for rotating the pulley mechanism oppositely to said predetermined direction, means for selectively moving the pulley mechanism into engagement with either the first or the second interconnecting means, and yieldably urged means for maintaining the pulley mechanism and the driven member in interconnecting relation.

5. A device for transmitting power from a rotatable driving member to a rotatable driven member comprising a support, a rotatable pulley mechanism movably carried by the support, belts interconnecting the pulley mechanism with the driving and driven members to cause the driven member to rotate in a predetermined direction, means for moving the pulley mechanism out of engagement with the belt interconnecting the pulley mechanism and the driving member and into frictional engagement with the driving member to reverse the direction of rotation of the driven member, and resilient means urging the pulley mechanism away from the rotatable driven member to constantly tension the belt interconnecting the pulley mechanism and the rotatable driven member.

6. A device for transmitting power from a rotatable driving member to a rotatable driven member comprising a support, first mounting means movably carried by the support, second mounting means movably carried by the first mounting means, a double sheave expansible pulley rotatably supported by the second mounting means, belts interconnecting the expansible pulley with the driving and driven members to cause rotation of the driven member in a predetermined direction, means resiliently urging the first mounting means away from the driving and driven members to normally maintain the belts in tension, and means for moving the second mounting means to adjust the expansible pulley relative to the driving and driven members in order to vary the speed ratio between the driving and driven members and to bring the expansible pulley into frictional engagement with the driving member while removing the pulley from belt engagement with the driving member to cause rotation of the driven member opposite to said predetermined direction.

7. In a transmission having a rotary drive member and a driven rotary member, an arrangement for transmitting power from the drive member to the driven member comprising a double sheave expansible pulley, a belt operatively connecting said drive member with one sheave of said pulley, a belt operatively connecting the other sheave of said pulley with said driven member, first mounting means rotatably supporting said pulley, second mounting means supporting said first mounting means for adjustment thereof relative to said drive and driven members, third mounting means pivotally supporting said second mounting means, spring means arranged to urge said pulley away from both said drive and said driven members, and an actuating lever for positively adjusting said first mounting means to different positions relative to said drive and driven members.

8. A transmission comprising a rotary drive member, a driven rotary member, and means for transmitting power from the drive member to the driven member including a double sheave expansible pulley, a belt operatively connecting said drive member with one sheave of said pulley, a belt operatively connecting the other sheave of said pulley with said driven member, first mounting means rotatably supporting said pulley, second mounting means pivotally supporting said first mounting means for adjustment thereof to different angular positions, third mounting means pivotally supporting said second mounting means, spring means acting upon said second mounting means to urge said pulley away from both said drive member and said driven member, and an actuating lever pivotally connected to said first mounting means for positively adjusting said first mounting means to different angular positions.

9. A device for transmitting power from a rotatable driving member to a rotatable driven member comprising a supporting frame, a bell crank pivotally secured to the supporting frame and having two arms, an elongated lever pivotally mounted intermediate its ends to one arm of the bell crank, a double sheave expansible pulley mechanism rotatably secured to one end of said lever, belts operably interconnecting the pulley mechanism with the driving and driven members, means pivotally connected to the other end of said lever for swinging said lever about its pivotal axis to place the pulley mechanism into a variety of driven positions, and a spring tensioned between the other arm of the bell crank and said supporting frame to resiliently urge the bell crank to swing the pivotal axis of the lever away from the driving and driven mechanisms to maintain the belts in tension upon swinging of said lever about its pivotal axis by the swinging means.

10. A device for transmitting power from a rotatable driving member to a rotatable driven member comprising a support, mounting means movably carried by said support, a double sheave expansible pulley supported from said mounting means for rotational and lineal movement independent of said mounting means, flexible power transmitting means interconnecting said pulley with the driving and driven members, and means resiliently urging said mounting means simultaneously away from both the driving and driven members to tension said flexible power transmitting means.

11. A mechanical transmission for transmitting power from a rotatable driving member to a rotatable driven member comprising a support, first mounting means movably carried by said support, second mounting means movably carried by said first mounting means, a pulley mechanism rotatably supported by said second mounting means, flexible power transmitting means interconnecting said pulley mechanism with the driving and driven members, and means resiliently urging the first mounting means away from the driving and driven members simultaneously to tension said flexible power transmitting means.

References Cited in the file of this patent

UNITED STATES PATENTS

| | | |
|---|---|---|
| 783,037 | Herby | Feb. 21, 1905 |
| 814,060 | Low | Mar. 6, 1906 |
| 1,236,749 | Osser | Aug. 14, 1917 |
| 2,131,247 | Winter | Sept. 27, 1938 |
| 2,561,545 | Wallace | July 24, 1951 |
| 2,591,746 | Tom | Apr. 8, 1952 |
| 2,722,131 | Chankalian | Nov. 1, 1955 |